(12) United States Patent
Koide

(10) Patent No.: US 7,531,776 B2
(45) Date of Patent: May 12, 2009

(54) PHOTODETECTOR, ELECTRO-OPTICAL DEVICE, AND ELECTRONIC APPARATUS HAVING A DIFFERENTIAL CURRENT DETECTION CIRCUIT

(75) Inventor: Shin Koide, Chino (JP)

(73) Assignee: Epson Imaging Devices Corporation, Azumino-Shi (JP)

( * ) Notice: Subject to any disclaimer, the term of this patent is extended or adjusted under 35 U.S.C. 154(b) by 40 days.

(21) Appl. No.: 11/882,906

(22) Filed: Aug. 7, 2007

(65) Prior Publication Data

US 2008/0073490 A1 Mar. 27, 2008

(30) Foreign Application Priority Data

Sep. 25, 2006 (JP) ............................. 2006-258778

(51) Int. Cl.
*G01J 1/32* (2006.01)
(52) U.S. Cl. ................................. 250/205; 250/214 AL
(58) Field of Classification Search ................. 250/205, 250/214 R, 214 AL, 214.1; 345/207, 690, 345/211; 362/276, 552, 88, 85; 455/574, 455/572, 566
See application file for complete search history.

(56) References Cited

U.S. PATENT DOCUMENTS 5,376,782 A * 12/1994 Ikeda et al. ............... 250/208.1
6,921,891 B2 7/2005 Seitz

FOREIGN PATENT DOCUMENTS

| JP | A 63-224373 | 9/1988 |
| JP | A-07-198483 | 8/1995 |
| JP | A-8-298337 | 11/1996 |
| JP | A 09-229763 | 9/1997 |
| JP | A-10-300574 | 11/1998 |
| JP | A 2002-176192 | 6/2002 |
| JP | A-2003-202264 | 7/2003 |
| JP | A 2005-345286 | 12/2005 |
| JP | A 2006-058058 | 3/2006 |
| JP | A 2006-112794 | 4/2006 |
| JP | A 2006-118965 | 5/2006 |
| JP | A 2006-194612 | 7/2006 |

OTHER PUBLICATIONS

Koide, S. et al., "LTPS Ambient Light Sensor with Temperature Compensation," IDW '06, AMD5—4L (Late-News Paper) p. 689-690 (2006).

* cited by examiner

*Primary Examiner*—Que T Le
(74) *Attorney, Agent, or Firm*—Oliff & Berridge, PLC

(57) ABSTRACT

A photodetector receiving object light and ambient light as incident light includes: a sensor circuit in which a sensor outputting a first current corresponding to the intensity of the incident light and a sub-sensor outputting a second current corresponding to the intensity of the ambient light are electrically connected in series with each other via a node; and a differential current detection circuit detecting a differential current between the first current and the second current, which is output from the node at the time of applying a voltage across the sensor circuit. Here, when the voltage applied across the sensor circuit is defined as a first voltage and the voltage output from the node is defined as a second voltage, the intensity of the object light is detected on the basis of the differential current created when the second voltage becomes equal to a reference voltage.

15 Claims, 11 Drawing Sheets

PHOTODETECTOR, ELECTRO-OPTICAL DEVICE, AND ELECTRONIC APPARATUS HAVING A DIFFERENTIAL CURRENT DETECTION CIRCUIT

BACKGROUND

1. Technical Field

The present invention relates to a photodetector receiving object light and ambient light as incident light, an electro-optical device having the photodetector, and an electronic apparatus having the electro-optical device.

2. Related Art

Electronic apparatuses such as personal computers and mobile phones having an electro-optical device mounted thereon as a display device are generally used under a variety of ambient conditions in which environment light varies in intensity. Accordingly, if driving conditions of electro-optical devices can be adjusted in response to the variation in intensity of the environment light, it is possible to improve image quality and to reduce power consumption. For example, in transmissive and transflective liquid crystal display devices, a backlight unit is disposed on the back side of a liquid crystal panel and light emitted from the backlight unit is modulated by the liquid crystal panel. In such a liquid crystal display device, a large amount of power is consumed by the backlight unit. However, if the liquid crystal display device is provided with a photodetector and the intensity of light emitted from the backlight unit adjusted in accordance with the intensity of the environment light, it is possible to reduce the power consumption. In addition, if the photodetector is formed on an element substrate of the liquid crystal display device, it is also possible to reduce cost for parts of the liquid crystal device. However, when an optical sensor is provided on the element substrate, not only object light to be detected but also light from the backlight unit are incident on the optical sensor.

A configuration is disclosed in JP-A-2006-118965, in which a primary sensor outputting a first current corresponding to the intensity of incident light and a sub-sensor outputting a second current corresponding to the intensity of ambient light are electrically connected in series with each other and a differential current between the first current and the second current, which is output from a node between the primary sensor and the sub-sensor, is detected by the use of a capacitor.

However, in the configuration described in JP-A-2006-118965, even if the primary sensor and the sub-sensor have the same photoelectric conversion characteristic, the intensity of the ambient light cannot be precisely detected in a certain range of ambient temperature. As a result, there is a problem in that the electro-optical device cannot be driven under the optimum conditions.

The inventor of the invention has tried to ascertain why the intensity of environment light (object light) cannot be precisely detected in a certain range of ambient temperature when the primary sensor and the sub-sensor have the same photoelectric conversion characteristic, and has arrived at the following conclusions.

First, the inventor studied the relationship between the ambient temperature and the current output from a PIN diode at the time of applying a voltage to photodiodes serving as the primary sensor and the sub-sensor, and obtained the results shown in FIGS. 12A and 12B. Here, the photodiodes used in the study were PIN photodiodes, each of which has an N-type region, an intrinsic region, and a P-type region in a polysilicon layer.

The current-voltage characteristic of the photodiode is shown in FIG. 12A. With the variation in ambient temperature, the current-voltage characteristic of the photodiode indicated by a solid line is changed to the characteristics indicated by a dashed line, a chain double-dashed line, and a dotted line in this order as the ambient temperature varies. The change in the current-voltage characteristic is attributable to dark current which will be described below with reference to FIG. 12B. Here, dark current means a current which flows across a diode when light is prevented from impinging on a photodiode. Dark current is attributable to the temperature of an intrinsic region. Moreover, in the PIN photodiode using a polysilicon layer, unlike a bulk-silicon-based PIN photodiode in which an N-type region, an intrinsic region and a P-type region are stacked, the N-type region, the intrinsic region, and the P-type region are laterally arranged. Because of the lateral arrangement, a junction area is narrow and dark current is thus liable to occur.

FIG. 12B shows the relationship between the ambient temperature and the current output from a photodiode at the time of applying a reverse bias voltage of $-4V$ to the photodiode serving as the primary sensor or the sub-sensor. In FIG. 12B, the solid line L1 indicates apparent photocurrent (the sum of true photocurrent and dark current) which flows when 500 lx of light is incident on the photodiode at ambient temperature, the dotted line indicates a current including only the dark current which flows under a condition that light is blocked so as not to be incident on the photoconductor. As shown in FIG. 12, the apparent photocurrent merely changes at a temperature of 25° C. (room temperature) or less but increases at a temperature higher than 50° C. On the other hand, the dark current is so small as to be negligible at a temperature of 25° C. (room temperature) or less, but increases as the temperature rises. The magnitude of the dark current becomes equal to that of the apparent current at a temperature higher than 50° C. That is, in the photodiode, the dark current prevails in the apparent photocurrent with the rise in ambient temperature. The dark current also increases with an increase in applied voltage.

Accordingly, in the photodetector disclosed in JP-A-2006-118965, when impedance of the primary sensor decreases due to the light radiation under a condition of a high temperature, the balance of a reverse bias voltage is broken. As a result, the dark current markedly affects the differential current and it is thus impossible to precisely detect the intensity of object light.

SUMMARY

An advantage of some aspects of the invention is to provide a photodetector which is capable of precisely detecting intensity of object light regardless of ambient temperature, an electro-optical device having the photodetector, and an electronic apparatus having the electro-optical device.

The invention is conceived on the basis of the knowledge described above with reference to FIGS. 12A and 12B. According to an aspect of the invention, there is provided a photodetector receiving object light and ambient light as incident light, the photodetector including: a sensor circuit in which a sensor outputting a first current corresponding to the intensity of the incident light and a sub-sensor outputting a second current corresponding to the intensity of the ambient light are electrically connected in series with each other via a node; and a differential current detection circuit detecting a differential current between the first current and the second current, which is output from the node at the time of applying a voltage across the sensor circuit. Here, when the voltage applied across the sensor circuit is defined as a first voltage and the voltage output from the node is defined as a second voltage, the intensity of the object light is detected on the basis of the differential current created when the second voltage becomes equal to a reference voltage. In the invention, the term, "object light", means a light component which is an object to be detected. For example, environment light (external light) corresponds to the object light in embodiments of the invention. On the other hand, the term, "ambient light", means a light component other than the object to be detected, and background light corresponds to the ambient light in the embodiments of the invention.

In the optical device, the differential current between the first current and the second current respectively output from the primary sensor and the sub-sensor corresponds to the intensity of the object light. Thus, it is possible to detect the intensity of the object light by the detection of the differential current. In addition, although an impedance differential is created between the primary sensor and the sub-sensor when the ambient temperature is high and a voltage applied to each of the primary sensor and the sub-sensor varies, an intensity of the object light is detected on the basis of the differential current created when a level of the voltage of a node between the primary sensor and the sub-sensor becomes equal to the reference voltage level. With such a configuration, the dark current is offset. As a result, the intensity of the object light can be detected with high precision regardless of the ambient temperature.

It is preferable that the sub-sensor has a light-blocking member on a light incidence surface thereof in order to block the object light among the object light and the ambient light which are incident on the light incidence surface not to be incident on the sub-sensor. With such a configuration, the structure of the sub-sensor outputting the second current corresponding to the intensity of the ambient light can be simplified.

It is preferable that photoelectric conversion characteristic of the primary sensor and the sub-sensor are equal to each other and an intensity of the object light is detected on the basis of the differential current created when a level of the second voltage becomes equal to the reference voltage level and to a half level of the first voltage.

It is preferable that the photodetector further comprises a node voltage correction circuit which corrects a level of the second voltage created at the time of applying the first voltage across the sensor circuit to the reference voltage level. By the act of the node voltage correction circuit, it is possible to adopt the configuration in which an intensity of the object light is detected on the basis of the differential current created when the level of the second voltage becomes equal to the reference voltage level.

In this case, it is preferable that the node correction circuit has the configuration in which it compares the level of the second voltage created at the time of applying the first voltage across the sensor circuit with the reference voltage level and adjusts a voltage level to be applied to an output line where the differential current output from the node is measured on the basis of the comparison result so as to maintain the second voltage at the reference voltage level.

Alternatively, the node voltage correction circuit may have the configuration in which it adjusts the voltage level to be applied to the output line where the differential current output from the node is measured and an intensity of the target line is detected on the basis of the differential current created when the level of the second voltage becomes equal to the reference voltage level.

It is preferable that the differential current detection circuit includes an amplifying circuit which amplifies the differential current to produce an amplified current and an intensity of the object light is detected on the basis of the amplified current. The differential current is a very small amount but an intensity of the object light can be precisely detected because the differential current is amplified by the amplifying circuit. On the other hand, there is probability that the precise detection of an intensity of the object light cannot be attained in the case in which a voltage is read out across a resistor because a resistor having high resistance is necessarily used as the resistor and the resistor acts like an antenna to thereby gather radio wave noise. However, even in such a case, the use of the amplification circuit for amplifying the differential current can eliminate such a problem.

It is preferable that the differential current detection circuit has the configuration in which it includes amplifying circuit having a first resistor interposed between the node and the voltage output portion of the node voltage correction circuit and a second resistor provided with resistance lower than that of the first resistor and interposed between the voltage output portion of the node voltage correction circuit and a portion to which a reference voltage is applied, and the differential current is amplified by the second resistor and then detected.

Alternatively, the differential current detection circuit may have the configuration in which it includes an amplifying circuit having a first transistor interposed between the node and the voltage output portion of the node voltage correction circuit and a second transistor forming a current mirror circuit by acting together with the first transistor, and the differential current is amplified by the second transistor and then detected.

It is preferable that each of the primary sensor and the sub-sensor is provided by, for example, a photodiode to which a reverse bias voltage is applied by the first voltage. In the case of composing the primary sensor and the sub-sensor by photodiodes, it is possible to form the primary sensor and the sub-sensor on an element substrate when forming thin film transistors on the element substrate of an electro-optical device by using a process of manufacturing the thin film transistors.

It is preferable that the photodiode includes an N-type region and a P-type region, each provided by a polysilicon layer with impurities therein. With such a configuration, it is possible to form the primary sensor and the sub-sensor on the element substrate using the same manufacturing process for thin film transistors when forming the thin film transistors by the use of a low-temperature process. The photodiode may have the configuration in which an intrinsic polysilicon layer is provided between the N-type region and the P-type region.

According to another aspect of the invention, there is provided an electro-optical device including the above-mentioned photodetector. In the electro-optical device, it is preferable that its driving conditions may be adjusted on the basis of the object light detection result from the photodetector. For example, in the case in which the electro-optical device includes a light source unit and an electro-optical panel which is capable of modulating light emitted from the light source unit, it is preferable that the intensity of light emitted from the light source unit is adjusted on the basis of the object light detection result from the photodetector.

According to still another aspect of the invention, there is provided an electronic apparatus such as a personal computer (PC), a mobile phone or a personal digital assistant (PDA), which has the electro-optical device according to the invention.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, embodiments of the invention will be described with reference to the drawings.

Basic Configuration and Principle of Photodetector

Figure 1A:
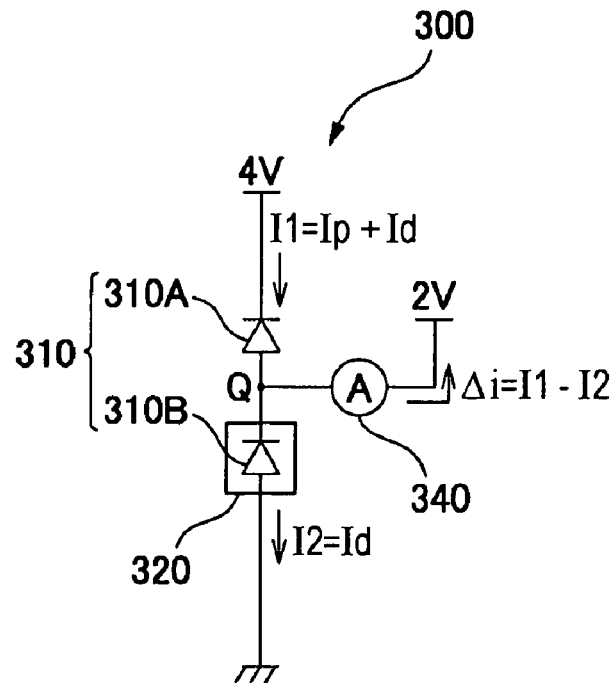
FIGS. 1A and 1B are schematic views illustrating a photodetector and a sample device thereof, respectively according to one embodiment of the invention.
Figure 1B:
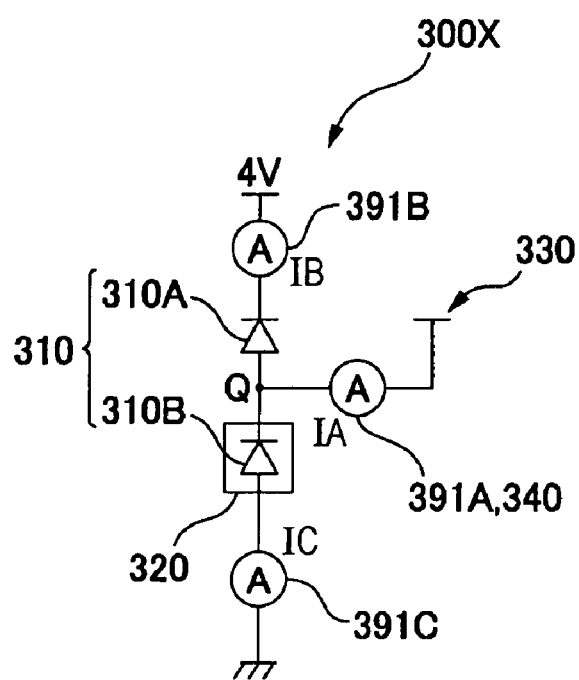
Figure 2:
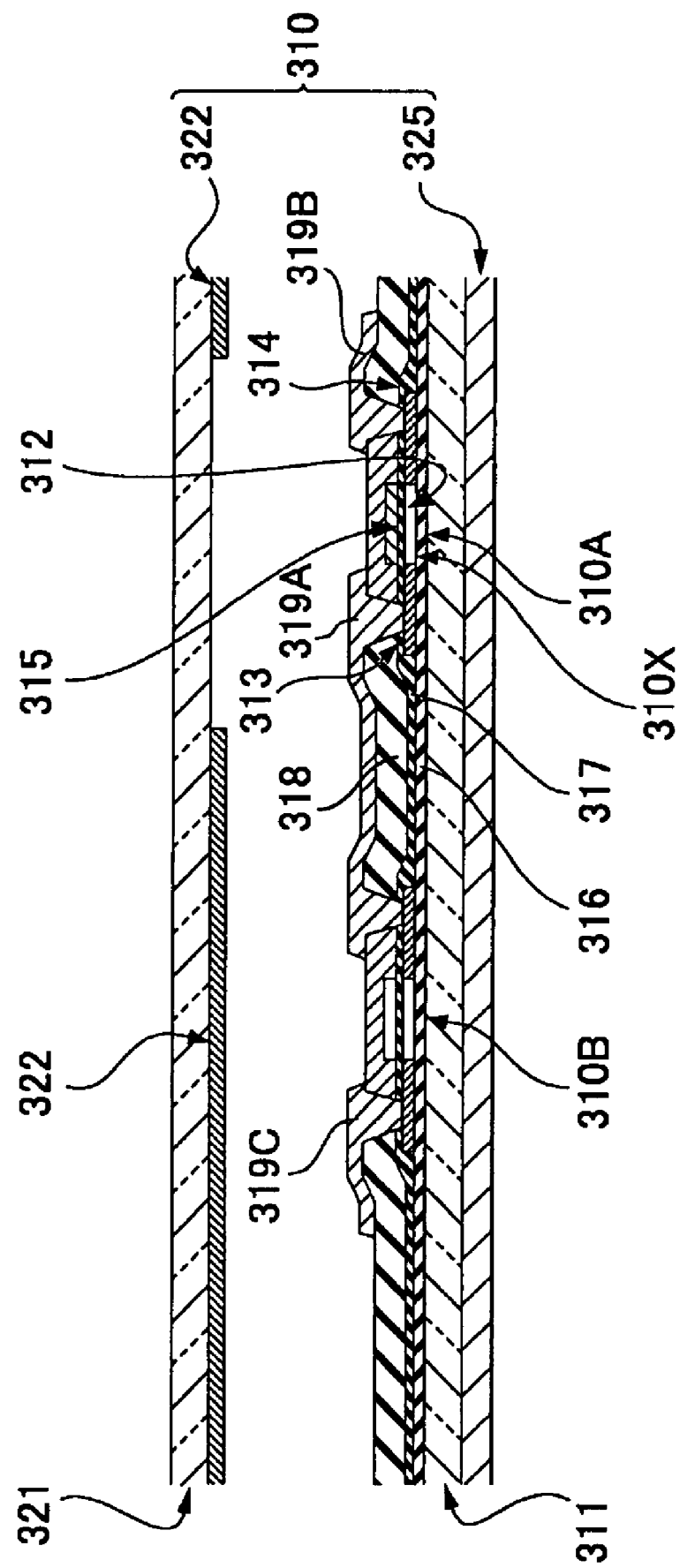
FIG. 2 is a sectional view illustrating an optical sensor (photodiode) used in the photodetector shown in FIGS. 1A and 1B.

FIGS. 1A and 1B schematically show a photodetector according to the invention and a sample device therefore. FIG. 2 shows a cross-section of an optical sensor (photodiode) used in the photodetector shown in FIG. 1.

As shown in FIG. 1A, in the photodetector 300 according to this embodiment, object light and ambient light are made incident as incident light to the photodetector 300 but the intensity of the object light is detected on the basis of an output corresponding to the object light. That is, the photodetector 300 includes a sensor circuit 310 in which a primary sensor 310A outputting a first current corresponding to the intensity of the incident light (composed of the object light and the ambient light) and a sub-sensor 310B outputting a second current corresponding to the intensity of the ambient light are electrically connected to each other via a node Q. The sub-sensor 310B has a light-blocking body 320, that enables the object light to be made incident to the sub-sensor 310B and prevents the ambient light from being made incident to the sub-sensor 310B. On the other hand, the primary sensor 310A does not have the light-blocking body 320, so that both the object light and the ambient are made incident to the primary sensor 310A.

In this embodiment, each of the primary sensor 310A and the sub-sensor 310B is constructed as a photodiode. A cathode of the primary sensor 310A is applied with a first voltage, for example 4V, and an anode of the sub-sensor 310B is grounded. As a result, the first voltage is applied across the sensor circuit 310 and a reverse bias voltage is applied to the primary sensor 310A and the sub-sensor 310B. The node Q between the primary sensor 301A and the sub-sensor 310B is provided with a differential current detection circuit 340 for detecting a differential current between a first current and a second current, in which the differential current is output from the node Q.

As shown in FIG. 2, for example, the primary sensor 310A and the sub-sensor 310B are constructed to have the same size and formed on an element substrate 311 of glass material. The primary sensor 310A and the sub-sensor 310B are disposed close to each other. In order to form primary sensor 310A and the sub-sensor 310B, a base dielectric layer 316, a polysilicon layer 310X, a dielectric layer 317, an inter-dielectric layer 318, and electrode layers 319A, 319B and 319C are further formed on the element substrate 311. In the polysilicon layer 310X, an N-type region 313 with N-type impurities, an intrinsic region 312 with no impurities and a P-type region 314 with P-type impurities are provided. Thus, the photodiode has an N-I-P structure. The polysilicon layer 310X is a semiconductor layer formed through a method in which an amorphous-structure silicon layer is first formed on the element substrate 311 and then subjected to a laser annealing or a lamp annealing process so as to become a polycrystal-structure layer. A metal layer 315 is formed on the dielectric layer 317 at a position where the metal layer 315 laterally overlaps the intrinsic region 312. The metal layer 315 serves as a cover layer for preventing introduction of impurities to the polysilicon layer 31X when introducing N-type impurities or P-type impurities into the polysilicon layer 310X. Accordingly, the metal layer 315 may be eliminated after the impurity introducing process. However, such elimination of the metal layer is not desirable because it increases the number of process steps. The electrode layers 319A, 319B and 319C are electrically connected to the N-type region 313 and the P-type region 314 via contact holes formed to penetrate through the inter-dielectric layer 318 and the dielectric layer 317.

The primary sensor 310A and the sub-sensor 310B having the aforementioned configurations are PIN photodiodes formed of Low-Temperature Poly-Silicon (LTPS), so that they are greatly photosensitive. Thus, they are suitable optical sensor elements for detecting the object light. In addition, the above-described primary sensor 310A and sub-sensor 310B have almost the same structure as a thin film transistor (TFT), so that they can be formed on an element substrate by the use of the same process for manufacturing TFTs constituting a pixel circuit, a scanning line driving circuit and a data line driving circuit in a liquid crystal display device (LCD device) which will be described below. In this case, the polysilicon layer 310X is simultaneously formed with active layers of the TFTs, the dielectric layer 317 is simultaneously formed with gate insulation layers, and the metal layer 315 is simultaneously formed with gate electrodes.

Such configurations are common in the primary sensor 310A and the sub-sensor 310B, but an opaque layer 322 is formed at a position where it laterally overlaps the sub-sensor 310B on an opposing substrate 321 of glass material, which is disposed to face the element substrate 311. The opaque layer 322 serves as the light-blocking body 320 shown in FIG. 1A.

Thus, both the object light and the ambient light are made incident to the primary sensor 310A, while the ambient light alone is made incident to the sub-sensor 310B. Here, the term "object light" means a light component which is an object to be detected and the object light corresponds to, for example, object light which will be explained below. On the other hand, the term "ambient light" means a light component which is not an object to be detected. For example, the ambient light corresponds to background light which will be described below. The opaque layer 322 formed on the opposing substrate 321 can be simultaneously formed with a black matrix which is formed on the opposing substrate for use in an LCD device which will be described below.

In addition, on the outer surface of the element substrate 311, a reflective plate 325 is arranged at a position where it laterally overlaps an area where the primary sensor 310A and the sub-sensor 310B are formed. With such a configuration, incidence of the ambient light from the element substrate 311 to the primary sensor 310A and the sub-sensor 310B is inhibited, so that it is possible to relatively increase an amount of photocurrent attributable to the object light.

The photodetector 300 according to this embodiment shown in FIG. 1A, the primary sensor 310A and the sub-sensor 310B are connected to each other via the node Q, so that the differential current $\Delta i$ (=I1−I2) between the first current I1 and the second current I2 is output from the node Q. Here, the first current I1 includes the photocurrent attributable to the object light and the ambient light and the dark current attributable to the ambient temperature (heat). The second current I2 includes the photocurrent attributable to the ambient light and the dark current attributable to the ambient temperature (heat). Accordingly, the differential current $\Delta i$ (=I1−I2) between the first current and the second current should correspond to the photocurrent attributable to only the object light. In addition, in order to satisfy such supposition, not only should both the primary sensor 310A and the sub-sensor 310B be disposed under the same ambient temperature, but also the temperature-dependant characteristics and the photoelectric conversion characteristic of the primary sensor 310A and the sub-sensor 310B should be identical to each other, respectively. Here, the term "temperature-dependant characteristic" is defined as the relationship between the ambient temperature and the magnitude of current according to the ambient temperature in the primary sensor 310A and the sub-sensor 310B. The primary sensor 310 and the sub-primary sensor 310B are manufactured by the same manufacturing process, so that a difference between the temperature-dependant characteristics of the primary sensor 310A and the sub-sensor 310B is in an allowable range. In addition, since the primary sensor 310A and the sub-sensor 310B are disposed close to each other, a difference between the ambient temperatures thereof is negligible.

In such a measurement principle, in order to explain how the dark current affects the detection result, it is supposed that no ambient light is made incident at all. Under the above supposition, the first current I1 includes true photocurrent Ip and dark current Id and the second current I2 includes only the dark current Id. In this case, the differential current $\Delta i$ is expressed by the following expression.

$$\Delta i = I1 - I2 = (Ip + Id) - Id = Ip \quad (1)$$

However, in a PIN diode, as the ambient temperature increases, a thermo-current attributable to heat generation likewise increases. Thus, the dark current prevails both in the first current I1 and the second current I2 to have a high dominance ratio, so that the dark current dependence on voltage increases. Accordingly, under the condition in which the ambient temperature is high, if impedance of the primary sensor 301A is decreased due to incident radiation, a variety of problems occurs such that a difference between impedances of the primary sensor 310A and the sub-sensor 310B occurs, a reverse bias voltage applied to the primary sensor 310A and the sub-sensor 310B fluctuates and the object light cannot be precisely detected.

Accordingly, in this embodiment, an intensity of the object light is detected on the basis of a differential current created when a voltage is applied across the sensor circuit 310 and a voltage (the second voltage) at the node Q becomes equal to a reference voltage level. Here, since photoelectric conversion characteristics of the primary sensor 310A and the sub-sensor 310B are equal to each other, the intensity of the object light is detected on the basis of the differential current created when a level of the second voltage becomes equal to the reference voltage level and to a half level of the first voltage.

For example, in the case in which the first voltage of 4V is applied across the sensor circuit 310, as shown in FIG. 1, the intensity of the object light is detected on the basis of the differential current $\Delta i$ created when the second voltage is maintained at 2V. Accordingly, under the condition of high ambient temperature, even if a difference between impedances of the primary sensor 310A and the sub-sensor 310B is created and the voltage applied to each of the primary sensor 310A and the sub-sensor 310B varies, since the intensity of the object light is detected on the basis of the differential current $\Delta i$ created when the voltage of a node between the primary sensor 310A and the sub-sensor 310B becomes a predetermined level, the dark current can be offset. Thus, it is possible to precisely detect the intensity of the object light even under the condition in which the ambient temperature is high.

Effectiveness Verification of the Photodetector 300

Figure 3A:
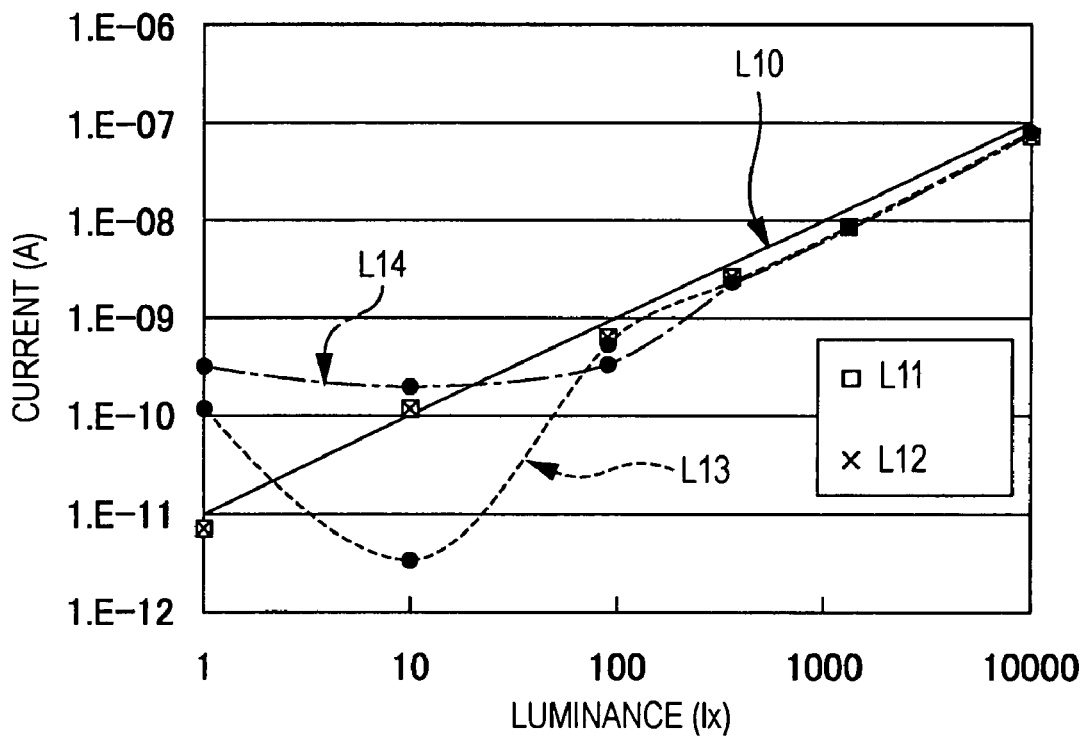
FIGS. 3A and 3B are graphs illustrating the relationship between luminance and current for explaining an advantage of the invention.
Figure 3B:
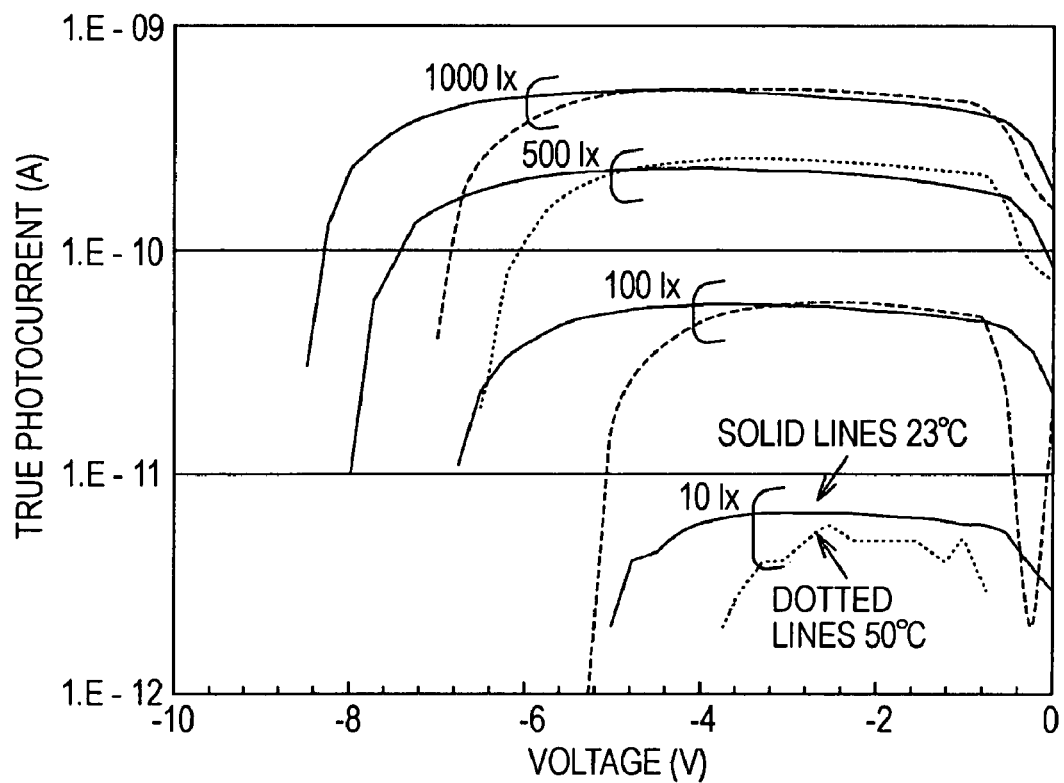

Verification of the effectiveness of the photodetector 300 used in the electro-optical device according to the aforementioned embodiment will be described below. FIG. 1B is a circuit diagram of a sample device provided in order to verify the effectiveness of the photodetector 300 of the invention. FIGS. 3A and 3B explanatory views for explaining operation and advantages of the photodetector according to the invention, in which FIG. 3A is a graph showing the relationship between luminance and an output current of the photodetector shown in FIG. 1B and FIG. 3B is a graph for explaining a stability range in true photocurrent of a photodiode.

In order to verify the effectiveness of the photodetector 300 according to the invention, in the sample device 300X shown in FIG. 1B, like the photodetector 300 described above with reference to FIG. 1A and FIG. 2, a sensor circuit 310 in which a primary sensor 310A outputting a first current corresponding to the intensity of incident light (object light and ambient light) and a sub-sensor 310B outputting a second current corresponding to the intensity of ambient light are electrically connected in series with each other is provided. In addition, a first voltage of 4V is applied across the sensor circuit 310, and a reverse bias voltage is applied to the primary sensor 301A and the sub-sensor 310B. The sub-sensor 310B blocks light incidence by a light-blocking body 320. A node voltage correction circuit 330 is provided on an output line where a differential current $\Delta i$ between the first current and the second current is output from the node Q and is measured and a current meter 391A (differential current detection circuit 340) is interposed in the middle of the output line.

In addition, a current meter 391B is interposed between a cathode of the primary sensor 310A and a driving line and a current meter 391C is interposed between an anode of the sub-sensor 310B and a grounded portion. Here, currents measured by the current meters 391A, 391B and 391C are referred to as 1A, 1B and 1C, respectively.

By the use of the sample device 300X with the aforementioned configurations, the relationship between the ambient temperature and the current in each of the cases in which the voltages applied to the node Q are 1.9 V and 2.0 respectively is studied. The results are shown in the graph in FIG. 3A. Marks denoted by reference symbols L11, L12, L13 and L14 in FIG. 3A are the results obtained under the following conditions. The solid line L10 shows the graph expressed by $y=ax^\alpha$ where $\alpha x=1$.

|  | Ambient Temperature (° C.) | Voltage of Node Q (V) | Current |
|---|---|---|---|
| Mark L11 | 23 | 1.9 | IB - IC |
| Mark L12 | 23 | 1.9 | 1A |
| Dotted Line L13 | 50 | 1.9 | 1A |
| Dashed Line L14 | 50 | 2.0 | 1A |

In FIG. 3A, from the aspect that the results denoted by reference symbols L11 and L12 are duplicated, it is apparent that a difference between the current 1A and the current IB flowing across the primary sensor 310A and the sub-sensor 310B, respectively is output from the node Q. In addition, from the point that the results denoted by reference symbols L11 and L12 are almost identical to the result indicated in the solid line L10, the current IA (differential current) output from the node Q has the proportional relationship with the luminance. Accordingly, when the temperature is at 23° C., the luminance can be detected by the current 1A output from the node Q even when the voltage of a node Q is 1.9 V.

However, as shown in the dotted line L13, when the voltage of a node Q is 1.9 V, the detection result is greatly different from the result indicated in the solid line L10 over luminance of 1 to 100 lx if the ambient temperature is 50° C., so that luminance cannot be detected by the current 1A (different current) output from the node Q. This means that under the condition of a high ambient temperature (50° C.), if the voltage of a node Q is not maintained at an optimum level, the proportional relationship between the luminance of the object light and the current 1A (differential current) is not established, so that the luminance of the object light cannot be precisely detected.

Whereas, in the case in which the voltage of a node Q is 2.0 V (reference voltage) as shown in the result indicated in the dashed line L14, even if the ambient temperature becomes 50° C., the detection result indicated in the solid line L10 can be obtained over the range from 1 to 100 lx and the luminance can be detected by the current 1A (differential current) output from the node Q. That is, even at a high ambient temperature (50° C.), if the voltage of a node Q is maintained at an optimum level (reference voltage level), the proportional relationship between the luminance of the object light and the current 1A (differential current) is established, so that the luminance of the object light can be precisely detected.

Figure 12A:
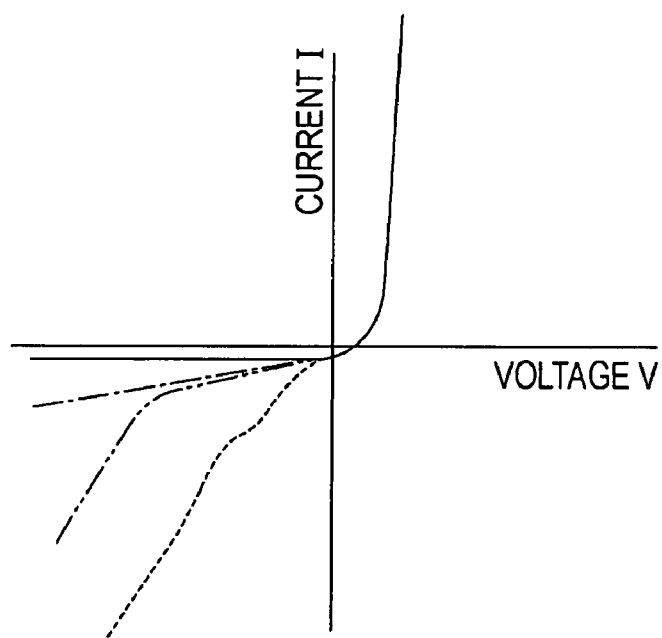
FIGS. 12A and 12B are graphs illustrating a voltage-current characteristic and a temperature dependence of current of a known photodiode.
Figure 12B:
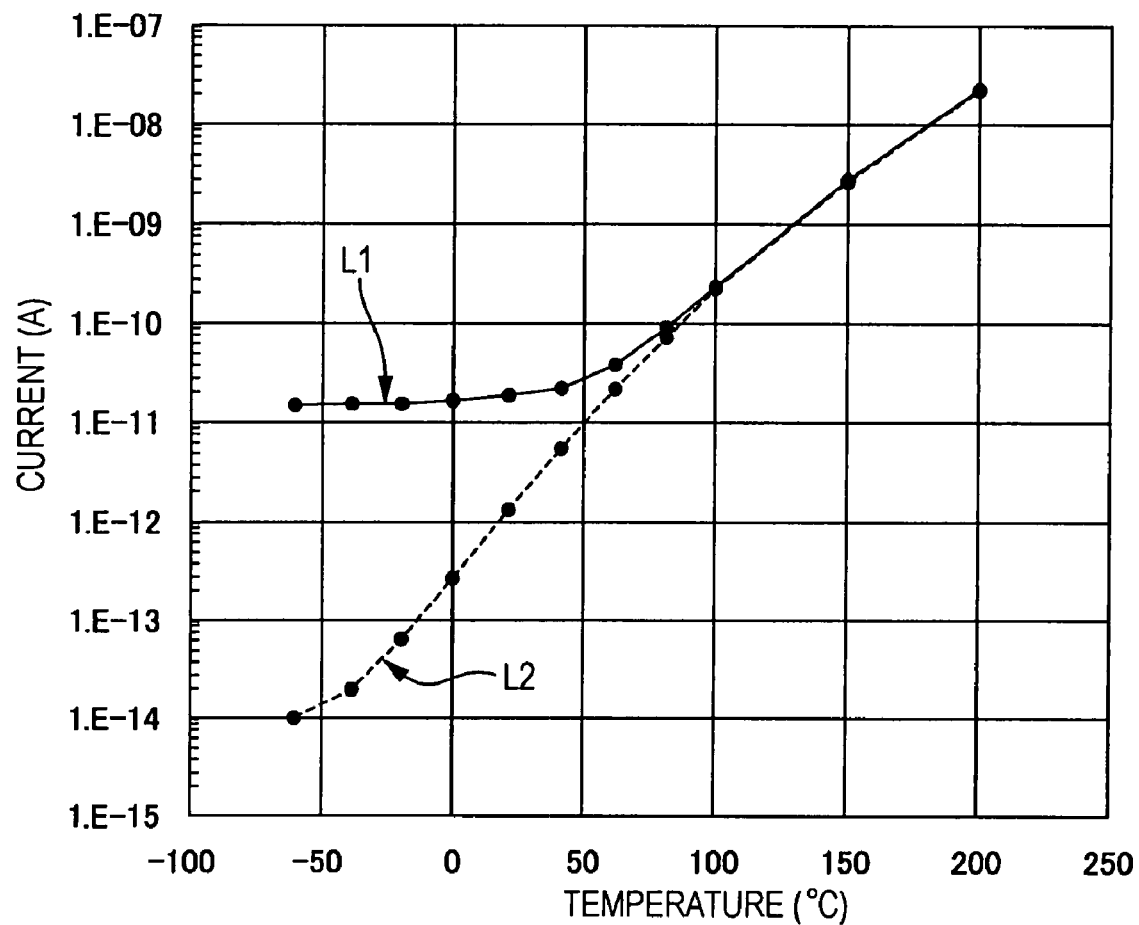

The basis that the proportional relationship between the luminance of the object light and the current 1A (differential current) is established in the case in which the voltage of a node Q is maintained at an optimum level (reference voltage level) will be described with reference to FIG. 3B. FIG. 3B shows the calculation result of a true photocurrent which is calculated by subtracting a dark current (the magnitude indicated in the dotted line L2) from an apparent photocurrent (the magnitude indicated in the solid line L1) shown in FIG. 12B. In FIG. 3B, the photocurrent-voltage characteristics at ambient temperatures of 23° C. and 50° C., respectively are indicated in solid lines and dotted lines, respectively. As known from FIG. 3B, the true photocurrent changes in its magnitude according to the temperature and the luminance, but there is a stability range where the magnitude of current does not change with change in applied voltage. Accordingly, if the differential current is detected under the condition in which the reference voltage is in the stability range, the dark current surely can be offset and the true photocurrent can be detected.

First Application to Electro-optical Device

Overall Configuration of Electro-optical Device

Figure 4:
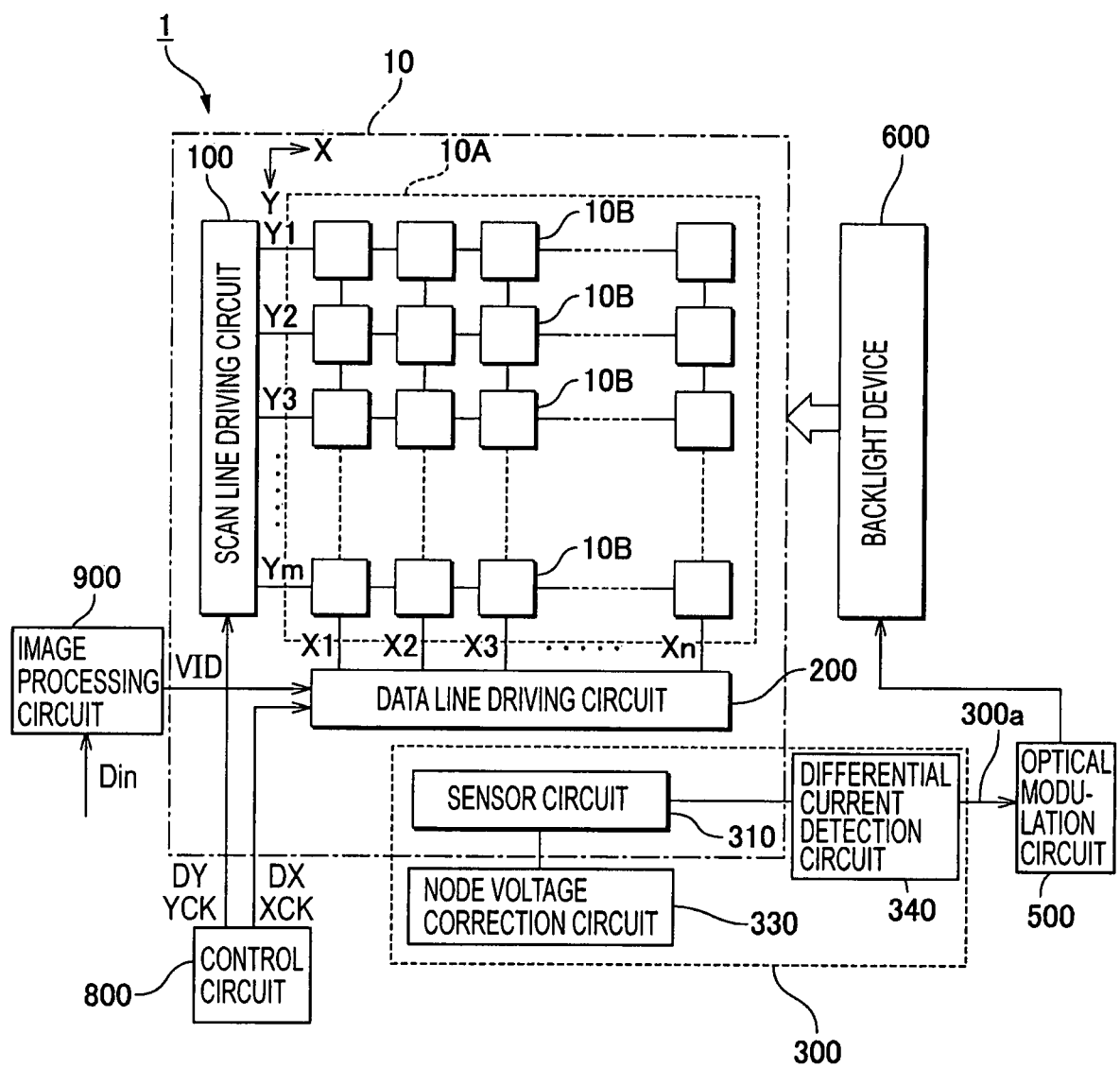
FIG. 4 is a block diagram illustrating the overall structure of an electro-optical device according to one embodiment of the invention.
Figure 5:
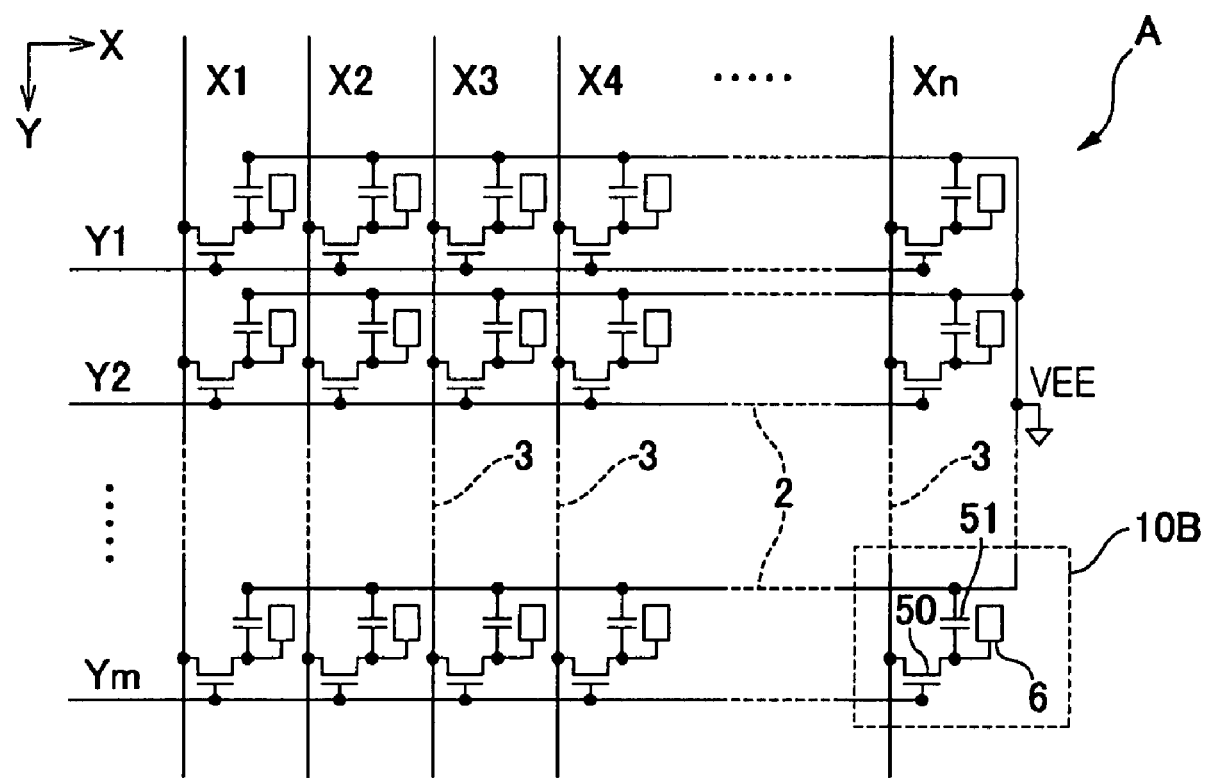
FIG. 5 is a circuit diagram illustrating an image display region of the electro-optical device shown in FIG. 4.
Figure 6:
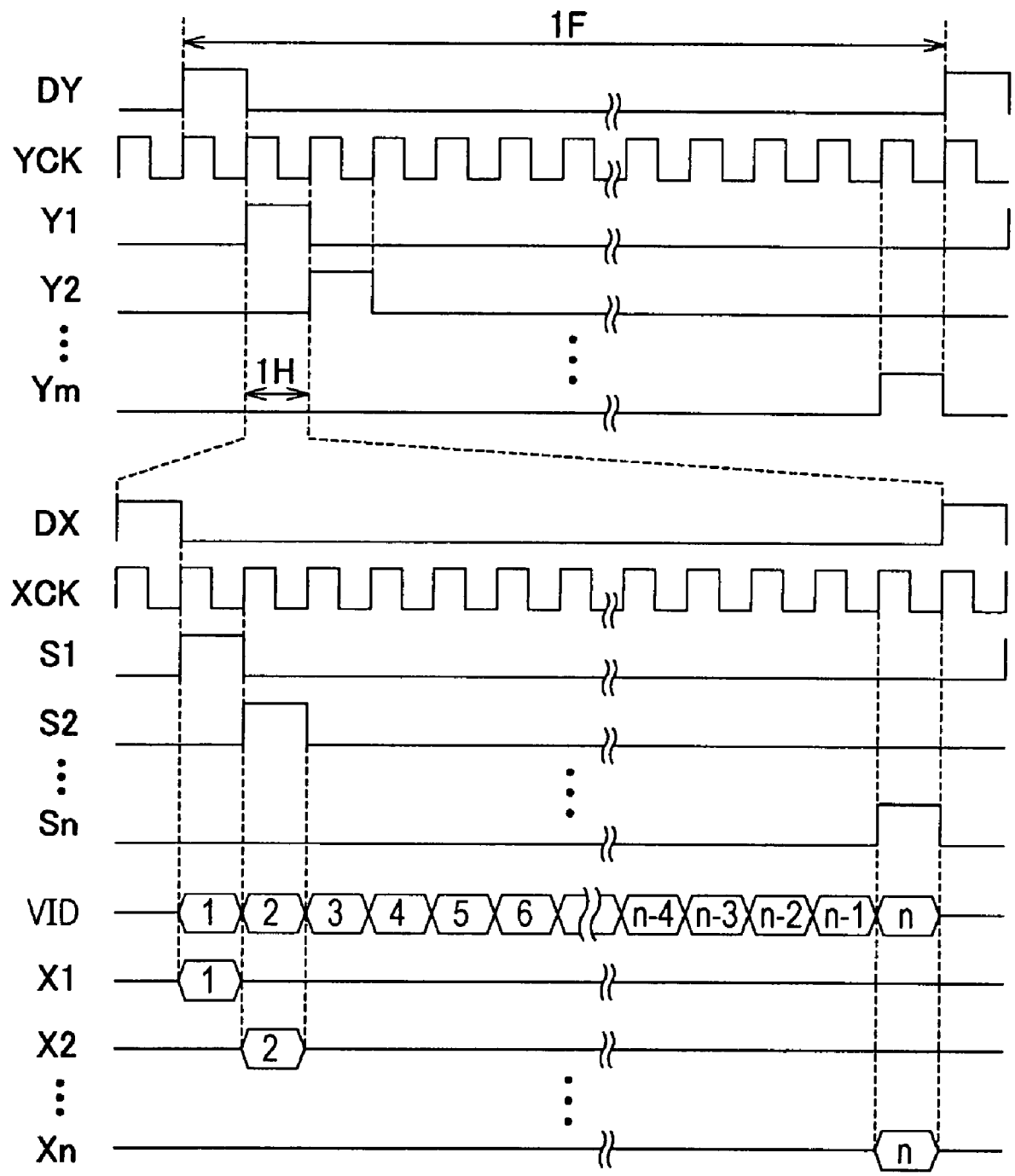
FIG. 6 is a timing chart illustrating the operation of a scanning line driving circuit and a data line driving circuit of the electro-optical device shown in FIG. 4.

FIG. 4 shows the overall configuration of an electro-optical device including the photodetector of the invention. FIG. 5 shows an exemplary image display area of the electro-optical device shown in FIG. 4. FIG. 6 shows a timing chart illustrating the operations of a scanning line driving circuit and a data line driving circuit of the electro-optical device shown in FIG. 4.

The electro-optical device 1 including the photodetector according to the invention shown in FIG. 1 is a liquid crystal display device (LCD device) using liquid crystals as electro-optical material. A main part of the electro-optical device 1 is a liquid crystal panel 10 (one example of an electro-optical panel). The liquid crystal panel 10 has the configuration in which an element substrate on which TFTs serving as switching elements are formed and an opposing substrate thereof are disposed in a manner such that respective surfaces on which their own electrodes are formed face each other and bonded to each other with a predetermined gap therebetween, where liquid crystals are provided in the gap. The configuration is the same as that of known LCD devices, so that detailed explanation thereof will be omitted.

The electro-optical device 1 according to this embodiment includes a liquid crystal panel 10, an optical modulation circuit 500, a backlight unit 600 (light source device), a control circuit 800 and an image processing circuit 900. The liquid crystal panel 10 is a transmissive type but may be alternatively a reflective type. The liquid crystal panel 10 includes an image display area 10A, the scanning line driving circuit 100 and the data line driving circuit 200 formed on an element substrate thereof. The control circuit 800 generates X-transmission start-up pulses DX and an X-crosstalk signal XCK and then provides them to the data line driving circuit 200, and also generates Y-transmission start-up pulses DY and a Y-crosstalk signal YCK and then provides them to the scanning line driving circuit 100. A plurality of pixel circuits 10B is formed in the form of a matrix in the image display area 10A and transmittances of the pixel circuits 10B can be individually controlled. Light from the backlight unit is emitted out through the pixel circuits 10B. Thus, a gray scale can be expressed by optical modulation.

As shown in FIG. 5, in the image display area 10A, the number m (m is a natural number two or more) of scanning lines 2 are arranged in parallel with each other to run in X direction and the number n (n is a natural number two or more) of data lines 3 are arranged in parallel with each other to run in Y direction. At around each of intersections of the scanning lines 2 and the data lines 3, a gate of a TFT 50 is connected to the scanning line 2, a source of the TFT 50 is connected to the data line and a drain of the TFT 50 is connected to a pixel electrode 6. Each pixel is constructed by including the pixel electrode 6, an opposing electrode formed on the opposing substrate and liquid crystal interposed between the pixel electrode 6 and the opposing electrode.

Thus, the pixels are arranged in the form of a matrix in a manner such that they match with corresponding intersections of the scanning lines 2 and the data lines 3.

Scan signals Y1, Y2, ..., Ym, each in the pulse form, are applied in turns to the scanning lines 2 to which the gates of the TFTs 50 are coupled. Thus, if a scanning signal is supplied to one of the scanning lines 2, the TFTs 50 coupled to the scanning line to which the scanning signal is supplied are turned on, so that data signals X1, X2, ..., Xn in a predetermined dynamic form are supplied from the data lines 3 and written into the corresponding turned-on pixels in turns and then data written into the pixels are retained for a predetermined period.

Orientation or order of liquid crystal molecules are changed according to a voltage applied to each pixel, so that a gray scale can be displayed by optical modulation. For example, in a normally white mode, the intensity of light transmitting through the liquid crystal comes to be limited with the increase in the voltage. However, in a normally black mode, since the limitation to light transmittance is alleviated with the increase in the voltage, each pixel over the overall electro-optical device 1 emits light having a contrast corresponding to an image signal. Accordingly, a predetermined display can be attained.

In addition, in order to reduce leakage of the image signal which is retained in the pixel, a storage capacitor 51 is added in a manner such that it is disposed in parallel with a liquid crystal capacitor formed between the pixel electrode 6 and the opposing electrode. For example, a voltage of the pixel electrode 6 is retained for a period three order times longer than a period during which a source voltage is applied, so that the retention characteristic is improved. As a result, a high contrast ratio is realized.

As shown in FIG. 6, the scanning line driving circuit 100 generates the scanning signals Y1, Y2, ..., and Ym by sequentially shifting the Y-transmission start-up pulses having a frequency of 1 frame (1F) in response to the Y clock signal YCK. The scanning signals Y1, Y2, ..., and Ym are activated in turns during corresponding horizontal scanning periods (1H). The data line driving circuit 200 internally generates sampling signals S1, S2, ..., and Sn by transmitting the X-transmission start-up pulses DX having a horizontal scan frequency in response to the X clock signal XCK. Thus, the data line driving circuit 200 performs a sampling with respect to an image signal VID using the sampling signals S1, S2, ..., and Sn, thereby generating the data signals X1, X2, ..., and Xn.

Configuration of the Photodetector 300

Figure 7:
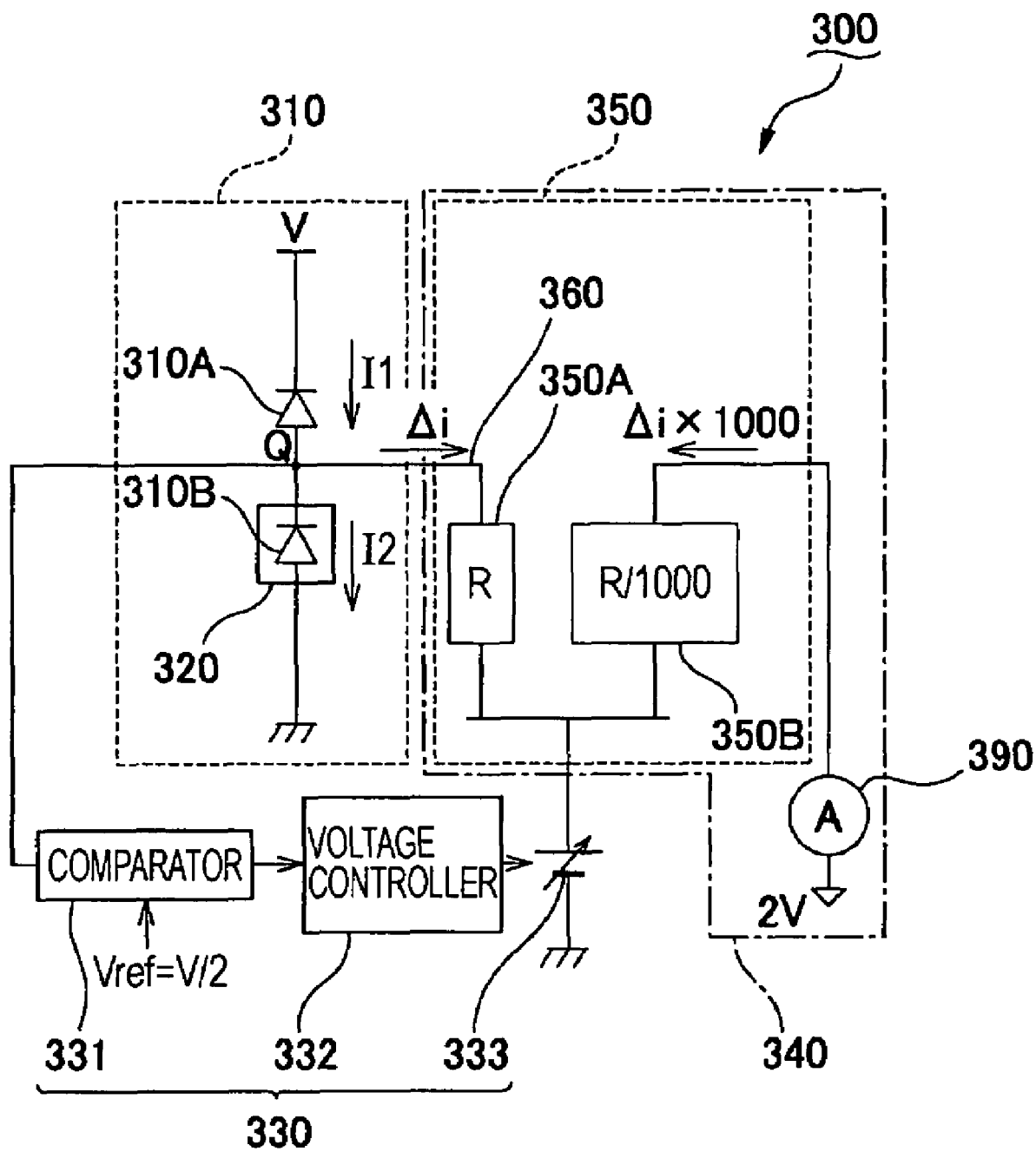
FIG. 7 is a schematic view illustrating a photodetector disposed in the electro-optical device shown in FIG. 4.

FIG. 7 schematically shows the configuration of a photodetector disposed in the electro-optical device to which the invention is applied. In the electro-optical device 1 shown in FIG. 1, visibility of a display image depends on environment brightness. For example, under natural sunlight during daylight hours, there is a need to make a display screen brighter by increasing brightness of lighting by the backlight unit 600. However, under dark surroundings during the hours of darkness, it is possible to display a clear image even at a relatively low brightness of lighting by the backlight unit 600 in comparison with the daylight hours. Accordingly, it is desirable that the brightness of lighting by the backlight unit 600 is controlled according to brightness of environment light.

For such a reason, the electro-optical device 1 of this embodiment is provided with the photodetector 300 and the photodetector 300 measures luminance of environment light. In addition, the optical modulation circuit 500 controls the backlight unit 600 in a manner such that the backlight unit 600 emits light with brightness which matches luminance data 300a obtained by the photodetector 300. The luminance data 300a is data showing environment luminance. The photodetector disposed in the electro-optical device 1 of this embodiment is the same as the photodetector 300 described with reference to FIG. 1A and FIG. 2.

That is, as shown in FIG. 7, the photodetector 300 includes a sensor circuit 310 in which a primary sensor 310A outputting a first current corresponding to the intensity of incident light (environment light (external light/object light)) and background light (leaked light from the backlight unit 600 (ambient light)) and a sub-sensor outputting a second current corresponding to the intensity of ambient light are electrically connected in series with each other. Here, the sub-sensor is provided with a light-blocking body 320 (see FIG. 2 and refer to the opaque layer 322), so that the ambient light is made incident but the object light is not made incident to the sub-sensor 310B. On the other hand, since the primary sensor 310A is not provided with the light-blocking body 320, both the object light and the ambient light are made incident to the primary sensor 310A.

Here, each of the primary sensor 310A and the sub-sensor 310B is composed of a photodiode. A cathode of the primary sensor 310A is supplied with a first voltage of 4 V and an anode of the sub-sensor is grounded. That is, the first voltage of 4 V is applied across the sensor circuit 310 and a reverse bias voltage of 2 V is applied to each of the primary sensor 310A and the sub-sensor 310B. In addition, a node Q between the primary sensor 310A and the sub-sensor 310B is provided with a differential current detection circuit 340 which detects a different current between the first current and the second current.

In the photodetector 300 according to this embodiment, a node voltage correction circuit 300 for correcting a voltage level at the node Q to a reference voltage level is provided on an output line 360 where the different current Δi output from the node Q is output. The node voltage correction circuit 330 is constructed to include a voltage source 333 for adjusting the voltage level of the node Q, a comparator 331 for controlling the voltage source 333 and a voltage controller 332. The comparator 331 compares the voltage level of the node Q with a reference voltage Vref and outputs a high level signal when the voltage level of the node Q is higher than the reference voltage Vref and a low level signal when the voltage level of the node Q is lower than the reference voltage level Vref. The voltage controller 322 adjusts a voltage applied by the voltage source 333 to the node Q according to the output result from the comparator 331. Accordingly, in this embodiment, the node voltage correction circuit 330 always maintains the voltage of a node Q at the reference voltage level Vref. In this embodiment, the reference voltage level Vref is equal to a half level (=2 V) of the voltage (4 V) applied across the sensor circuit 310. Accordingly, the node voltage correction circuit always maintains the voltage of a node Q at 2 V.

In addition, the photodetector 300 according to this embodiment further includes an amplifying circuit 350 for amplifying the differential current Δi. That is, the differential current circuit 340 includes a first resistor 350A interposed between the node Q and a voltage output portion (voltage source 333) of the node voltage correction circuit 330, that is, in the output line 360 where the differential current Δi output from the node Q is output, and a second resistor 350B having resistance lower than that of the first resistor 350A. The second resistor 350B is interposed between the voltage output portion of the node voltage correction circuit 330 and the reference voltage (constant voltage of 2 V). Further, a current meter 390 for measuring a current flowing through the second resistor 350B is interposed between the second resistor 350B and the reference voltage (constant voltage of 2 V). Here, when resistance of the first resistor 350A is defined as R, resistance of the second resistor 350B is $1/1000$ times the resistance R. Accordingly, a current 1000 times larger than a current flowing through the first resistor 350A flows through the second resistor 350B. Here, values of the first resistor 350A and the second resistor 350B may be any values as long as they are enough to amplify the differential current Δi. The first resistor 350A and second resistor 350B can be composed of a metal layer, a polysilicon layer or an indium tin oxide layer (ITO layer). These layers are thin films for use in TFTs, wirings and pixel electrodes formed when the element substrate of the electro-optical device 1 is manufactured. The comparator 331, the voltage controller 332 and the voltage source 333 may be formed on the element substrate by the use of the same manufacturing process for TFTs or may be composed in a separate body from the liquid crystal panel.

As described above, in the electro-optical device 1 according to this embodiment, a difference (the differential current Δi) between the first current and the second current output from the primary sensor 310A and the sub-sensor 310B is a current value in which the leaked light (ambient light) from the backlight unit 600 is offset and corresponds the intensity of ambient light. Accordingly, the intensity of the object light can be detected by the detection of the differential current Δi. Further, brightness of lighting by the backlight unit 600 is adjusted on the basis of the detection result from the photodetector 300, it is therefore possible to control brightness of a display screen according to luminance of environment light. As a result, power consumption of the electro-optical device 1 can be reduced. Moreover, since the primary sensor 310A and the sub-sensor 310B are formed by the use of the same manufacturing process for elements such as TFTs, productivity of the electro-optical device 1 can be improved.

In the electro-optical device 1 according to this embodiment, although a difference between impedances of the primary sensor 310A and the secondary sensor 310B in the photodetector 300 is created and the voltages applied to the primary sensor 310A and the sub-sensor 310B vary, the differential current Δi is detected while maintaining the voltage of a node Q between the primary sensor 310A and the sub-sensor 310B at the reference voltage level Vref. Accordingly, the intensity of environment light (object light) can be detected with high precision regardless of the ambient temperature.

Second Application to Electro-optical Device

Figure 8:
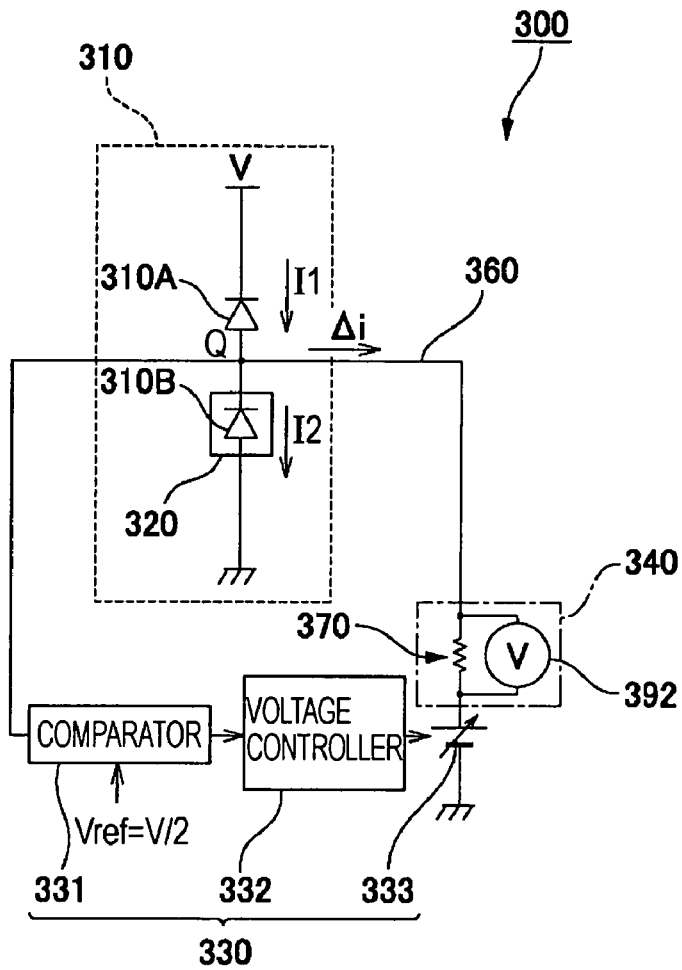
FIG. 8 is a schematic view illustrating a photodetector disposed in an electro-optical device according to another embodiment of the invention.

FIG. 8 schematically shows the configuration of a photodetector used in an electro-optical device according to the second application. The basic configuration of the electro-optical device according to this embodiment is the same as that of the aforementioned embodiment. Accordingly, like elements are described with like reference numerals and symbols.

The electro-optical device according to this embodiment is provided with the photodetector described with reference to FIG. 1A and FIG. 2. That is, as shown in FIG. 8, the photodetector 300 includes a sensor circuit 310 in which a primary sensor 310A outputting a first current corresponding to the intensity of incident light and a sub-sensor 310B outputting a second current corresponding to intensity of ambient light are electrically connected in series with each other. The sub-sensor 310B is provided with a light-blocking body (the opaque layer 322 shown in FIG. 2). Each of the primary sensor 310A and the sub-sensor 310B is composed of a photodiode. a first voltage of 4 V is applied across the sensor circuit 310. a reveries bias voltage of 2 V is applied to each of the primary sensor 310A and the sub-sensor 310B. The node between the primary sensor 310A and the sub-sensor 310B is provided with a differential current detection circuit 340 for detecting a differential current which is a difference between the first current and the second current and which is output from the node Q. The photodetector 300 further includes a node voltage correction circuit 330 for correcting a voltage level of the node to a predetermined reference voltage in order to maintain the voltage of a node Q at the reference voltage Vref. In this embodiment, a level of the reference voltage Vref is equal to a half level of the first voltage (4 V), that is, 2 V. Accordingly, the node voltage correction circuit 330 always maintains the voltage of a node Q at 2 V.

In the photodetector 300 according to this embodiment, the differential current detection circuit 340 includes a resistor 370A interposed between the node Q and a voltage output portion of the node voltage correction circuit 330, for example, on an output line 360 where the differential current Δi output from the node Q is output and a current meter 392 for measuring the magnitude of current flowing through the resistor 370 by measuring a voltage across the resistor 370.

Other configurations of this embodiment are the same as those in the aforementioned embodiment and thus detailed description thereof is omitted. However, in the photodetector 300 of this embodiment, like the above first embodiment, even if a difference between impedances of the primary sensor 310A and the sub-sensor 310B is created and voltages applied to the primary sensor 310A and the sub-sensor 310B are varied, the differential current Δi is detected in a state in which the node Q between the primary sensor 310A and the sub-sensor 310B is maintained at the reference voltage Vref. Accordingly, it is possible to precisely detect the intensity of environment light (object light) regardless the ambient temperature.

Another Embodiment

Figure 9:
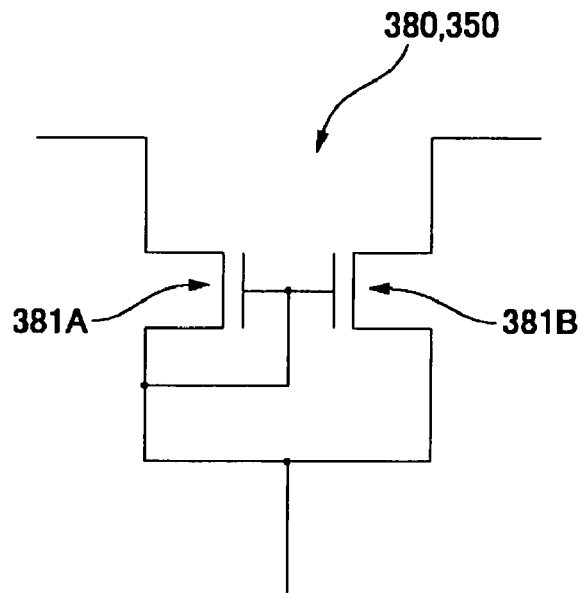
FIG. 9 is a schematic view illustrating a photodetector according to another embodiment of the invention.

FIG. 9 shows the configuration of the photodetector disposed in the electro-optical device according to the first application. In the photodetector 300 described with reference to FIG. 7, the amplifying circuit 350 is composed by two resistors 350A and 350B having different resistances. However, in this embodiment, the amplifying circuit may be constructed by using a first transistor 381A instead of the first resistor 350A and a second a second transistor 381B instead of the second resistor 350B, in which the second transistor 381B forms a current mirror circuit 380 by acting together with the first transistor 381A. In this case, when the width of the channel of the second transistor 381B is designed to be larger than that of the first transistor 381A, the differential current is amplified by the second transistor and then detected. Either of the first transistor 381A and the second transistor 381B is constructed by a transistor, they can be formed on the element substrate.

Still Another Embodiment

Figure 10A:
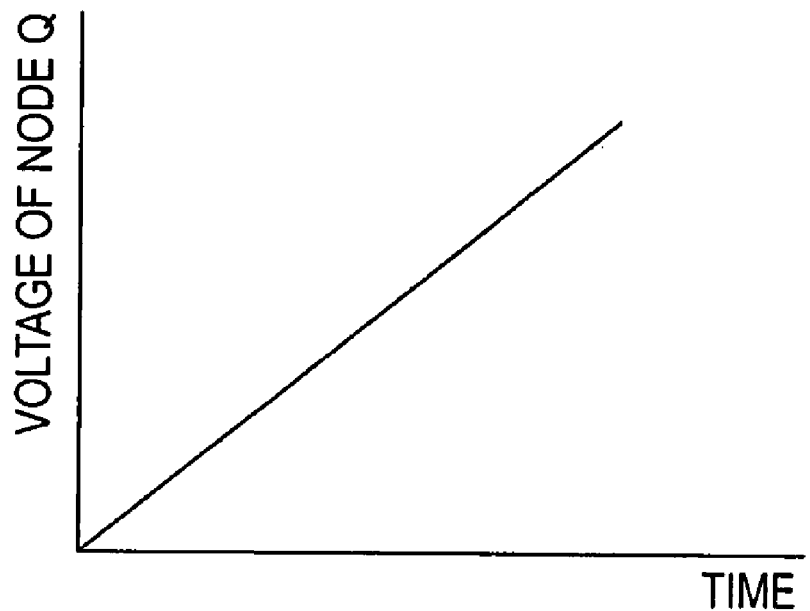
FIGS. 10A and 10B are graphs illustrating the change in a voltage of a node Q according to time for explaining an advantage of the invention.
Figure 10B:
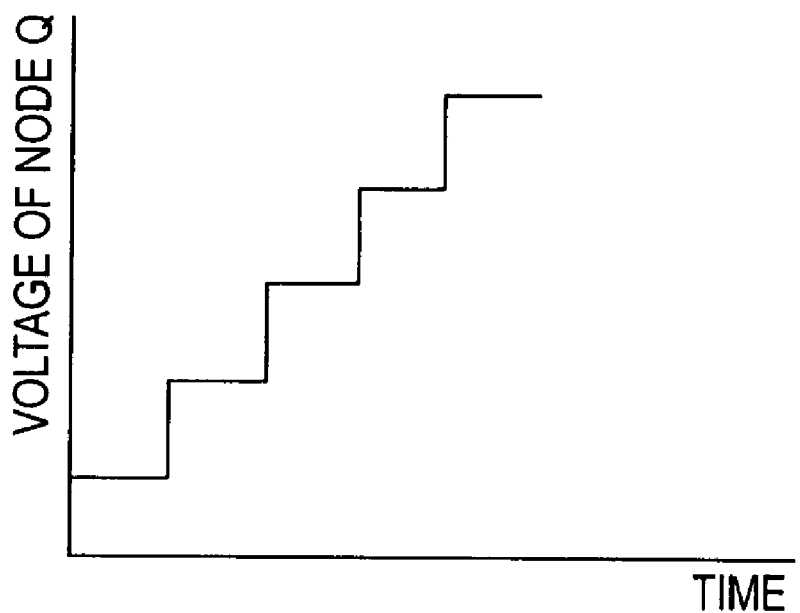

In the embodiments shown in FIGS. 7 and 8, the photodetectors are designed in a manner such that the voltage of a node Q is always maintained at 2 V thanks to the node voltage correction circuit 330. However, as shown in FIGS. 10A and 10B, the photodetector may be alternatively constructed. That is, the voltage of a node is changed linearly or stepwise by the node voltage correction circuit 330 and the intensity of the object light is detected on the basis of the differential current detected when the voltage of a node Q becomes equal to 2 V.

In this embodiment, it is exemplified that each of the primary sensor 310A and the sub-sensor 310B is composed of a photodiode using a polysilicon layer manufactured by a low-temperature process. However, alternatively each of the primary sensor 310A and the sub-sensor 310B may be composed of a photodiode using an amorphous silicon layer. Further alternatively, each of the primary sensor 310A and the sub-sensor 310B may be composed of a PN photodiode instead of the PIN photodiode. Yet further alternatively, each of the primary sensor 310A and the sub-sensor 310B may be composed of an N-type or a P-type TFT. In this case, the photocurrent may be detected by off leak current of the TFT.

In the aforementioned embodiment, it is exemplified that the number of each of the primary sensor 310A and the sub-sensor 310B is one. However, the number of each of the primary sensor 310A and the sub-sensor 310B may be plural. In this case, a plurality of nodes Q between primary sensors 310A and corresponding sub-sensors 310B are coupled to each other and the differential current is drawn. With such a configuration, since a plurality of primary sensors 310A and a plurality of sub-sensors 310B are used, the object light can be detected with greater precision. Moreover, it is possible to increase the magnitude of the differential current, so that a noise margin is improved. In this case, as for the arrangement of the primary sensors 310A and the sub-sensors 310B, the primary sensors 310A and the primary sensors 310B can be separately arranged in parallel with other or they can be alternately arranged.

Other Applications to Electro-optical Device

According to the aforementioned embodiment, in the LCD device, the intensity of light emitted from the backlight unit is controlled on the basis of the detection result from the photodetector 300, but alternatively a signal to be supplied to each pixel may be controlled on the basis of the detection result from the photodetector 300. In the aforementioned embodiment, the LCD device is exemplified as the electro-optical device, but alternatively the electro-optical device may be an organic electroluminescence device (OLE) so that a signal to be supplied to each pixel is controlled on the basis of the detection result from the photodetector.

Application to Electronic Apparatus

Figure 11A:
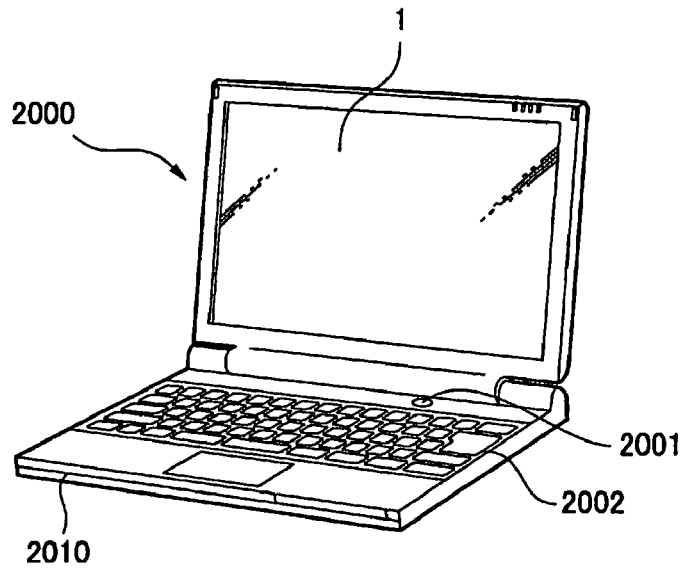
FIGS. 11A, 11B, and 11C are perspective views illustrating electronic apparatuses including the electro-optical device according to the invention.
Figure 11B:
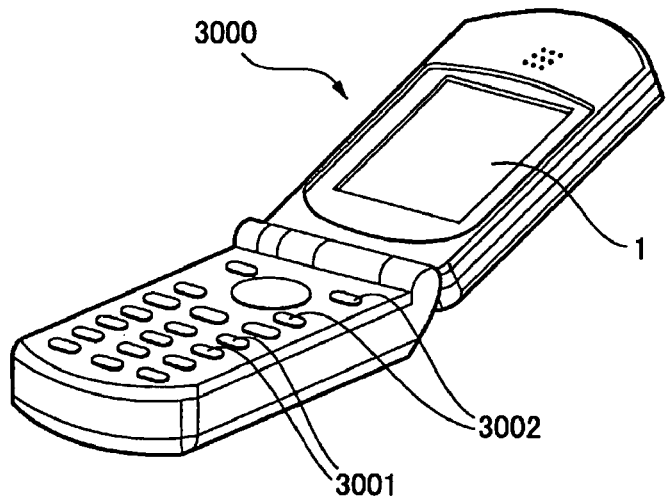
Figure 11C:
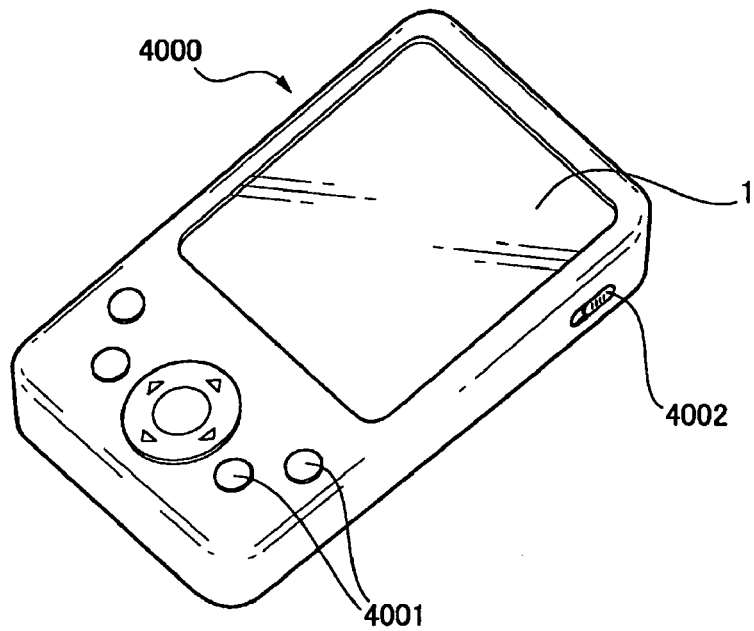

Hereinafter, an electronic apparatus including the electro-optical device 1 according to the aforementioned embodiment will be explained. FIG. 11A shows the configuration of a mobile-type personal computer including the electro-optical device 1. The personal computer 2000 includes the electro-optical device 1 serving as a display unit and a main body part 2010. The main body part 2010 is provided with a power supply switch 2001 and a key board 2002. FIG. 11B shows the configuration of a mobile phone including the electro-optical device 1. The cellular phone 3000 includes a plurality of manipulation buttons 3001, a plurality of scroll buttons 3002, and the electro-optical device 1 serving as a display unit. An image displayed on a screen of the electro-optical device 1 is scrolled by manipulating the scroll buttons 3002. FIG. 11C shows the configuration of a personal digital assistant (PDA) including the electro-optical device 1. The PDA 4000 includes a plurality of manipulation buttons 4001, a power supply switch 4002 and the electro-optical device 1 serving as a display unit. When the power supply switch is manipulated, a variety of forms of information, such as a list of addresses and a time table of schedules is displayed on the electro-optical device 1.

In addition to the examples shown in FIG. 11, there are many other electronic apparatuses to which the electro-optical device 1 can be applied. That is, the electro-optical device 1 can be disposed in electronic apparatuses such as a digital still camera, an LCD television set, a view finder-type video recorder, a monitor-type video recorder, a car navigation apparatus, a pager, an electronic scheduler, a television-combined telephone, a word processor, a POS terminal, and a touch panel.

The entire disclosure of Japanese Patent Application No. 2006-258778, filed Sep. 25, 2006 is expressly incorporated by reference herein.

What is claimed is:

1. A photodetector receiving object light and ambient light as incident light, the photodetector comprising:
    a primary sensor circuit in which a sensor outputting a first current corresponding to the intensity of the incident light and a sub-sensor outputting a second current corresponding to the intensity of the ambient light are electrically connected in series with each other via a node; and
    a differential current detection circuit detecting a differential current between the first current and the second current, which is output from the node at the time of applying a voltage across the sensor circuit,
    wherein when the voltage applied across the sensor circuit is defined as a first voltage and the voltage output from the node is defined as a second voltage, the intensity of the object light is detected on the basis of the differential current created when the second voltage becomes equal to a reference voltage.

2. The photodetector according to claim 1, wherein the sub-sensor has a light-blocking member on its light-receiving face onto which the object light impinges and the light-blocking member blocks the object light out of the object light and the ambient light.

3. The photodetector according to claim 1, wherein photoelectric conversion characteristics of the primary sensor and the sub-sensor are equal to each other, and an intensity of the object light is detected on the basis of the differential current created when a level of the second voltage becomes equal to a reference voltage level and to a half the level of the first voltage.

4. The photodetector according to claim 1, further comprising a node voltage correction circuit correcting the second voltage created at the time of applying the first voltage across the sensor circuit to the reference voltage,
    wherein an intensity of the object light is detected on the basis of the differential current created when the second voltage becomes equal to the reference voltage level by an action of the node voltage correction circuit.

5. The photodetector according to claim 4, wherein the node voltage correction circuit compares the level of the second voltage created at the time of applying the first voltage across the sensor circuit with the level of the reference voltage, and then maintains the second voltage at the reference voltage level by adjusting a voltage to be applied to an output line from which the differential voltage output from the node is measured, on the basis of the comparison result.

6. The photodetector according to claim 4, wherein the node voltage correction circuit adjusts the voltage to be applied to the output line where the differential current output from the node is measured, and an intensity of the object light is detected on the basis of the differential current created when the level of the second voltage becomes equal to the reference voltage level.

7. The photodetector according to claim 1, wherein the differential current detection circuit includes an amplifying circuit which amplifies the differential current so as to produce an amplified current, and an intensity of the object light is detected on the basis of the amplified current.

8. The photodetector according to claim 4, wherein the differential current detection circuit comprises a first resistor provided between the node and a voltage output portion of the node voltage correction circuit and a second resistor provided with resistance lower than that of the first resistor and interposed between the voltage output portion of the node voltage correction circuit and a portion to which a reference voltage is applied, and wherein the differential current is amplified by the second resistor and then detected.

9. The photodetector according to claim 4, wherein the differential current circuit includes a first transistor interposed between the node and a voltage output portion of the node voltage correction circuit and a second transistor constituting a current mirror circuit together with the first transistor, and wherein the differential current is amplified by the second transistor and then detected.

10. The photodetector according to claim 1, wherein each of the primary sensor and the sub-sensor is a photodiode reverse-biased by the first voltage.

11. The photodetector according to claim 10, wherein the photodiode has an N-type region and a P-type region, which are disposed in a polysilicon layer with impurities therein.

12. The photodetector according to claim 11, wherein the photodiode has an intrinsic polysilicon layer disposed between the N-type region and the P-type region.

13. An electro-optical device comprising the photodetector according to claim 1, wherein driving conditions are controlled on the basis of a detection result from the photodetector.

14. The electro-optical device according to claim 13, further comprising:

a light source unit; and an electro-optical panel being capable of modulating light emitted from the light source unit, wherein the intensity of light emitted from the light source unit is controlled on the basis of the detection result of the object light from the photodetector.

15. An electronic apparatus comprising the electro-optical device according to claim 13.

* * * * *